United States Patent [19]

Kagami et al.

[11] Patent Number: 5,872,677
[45] Date of Patent: Feb. 16, 1999

[54] MAGNETIC HEAD POSITION DETECTING METHOD AND MAGNETIC DISK APPARATUS

[75] Inventors: Naoyuki Kagami, Fjuisawa; Akira Tokizono; Yuzo Nakagawa, both of Kanagawa-ken, all of Japan

[73] Assignee: International Business Machines Corporation, Armonk, N.Y.

[21] Appl. No.: 735,689

[22] Filed: Oct. 23, 1996

[30] Foreign Application Priority Data

Oct. 24, 1995 [JP] Japan .................................. 7-275959

[51] Int. Cl.$^6$ .................................................. G11B 5/596
[52] U.S. Cl. .................................... 360/77.05; 360/77.07; 360/78.14
[58] Field of Search .............................. 360/77.05, 77.06, 360/77.08, 77.07, 78.04, 78.14

[56] References Cited

U.S. PATENT DOCUMENTS

| 4,816,941 | 3/1989 | Edel et al. | 360/77.05 |
| 5,189,571 | 2/1993 | Murphy et al. | 360/75 |
| 5,220,468 | 6/1993 | Sidman | 360/77.05 |
| 5,510,939 | 4/1996 | Lewis | 360/77.05 |
| 5,541,785 | 7/1996 | Sasamoto et al. | 360/77.05 |
| 5,566,034 | 10/1996 | Shumaker | 360/77.04 |

FOREIGN PATENT DOCUMENTS

| 6243617 | 9/1994 | Japan . |
| WO85/01145 | 3/1985 | WIPO . |

*Primary Examiner*—Thang V. Tran
*Attorney, Agent, or Firm*—Shawn B. Dempster; Matthew J. Bussan; David W. Lynch

[57] ABSTRACT

A magnetic head position detecting method is provided in which a first and a second position detection signal representative of a particular position of a magnetic head with respect to a magnetic disk is obtained. The first and the second position detection signal preferably is obtained by utilizing a burst pattern formed on the magnetic disk. Subsequently, a third position detection signal is generated by multiplying the first and the second position detection signals by a predetermined gain so that the third position detection signal changes linearly. The particular position of the magnetic head is detected by using the third position detection signal. In addition, a magnetic disk apparatus implementing the magnetic head position detecting method is provided.

17 Claims, 8 Drawing Sheets

MAGNETIC HEAD POSITION DETECTING METHOD AND MAGNETIC DISK APPARATUS

FIELD OF THE INVENTION

The present invention relates generally to a magnetic head position detecting method and a magnetic disk apparatus. More particularly the present invention relates to a magnetic head position detecting method and a magnetic disk unit which record a burst pattern on a magnetic disk and detect the position of a magnetic head.

BACKGROUND OF THE INVENTION

A plurality of data tracks are concentrically formed on a magnetic disk, such as a hard disk and a flexible disk. In a case where only reading or writing of information is performed with respect to the magnetic disk, the magnetic head is moved along the radial direction of the magnetic disk to make the head so that it corresponds to a specific data track (so-called seek operation), and then reading of information or writing of information is performed with respect to the specific data track. The positioning of the magnetic head for making the magnetic head so that it corresponds to the specific data track (so-called track following), as is well known, is performed by reading out the burst patterns recorded along the radial direction of the magnetic disk.

Figure 8:
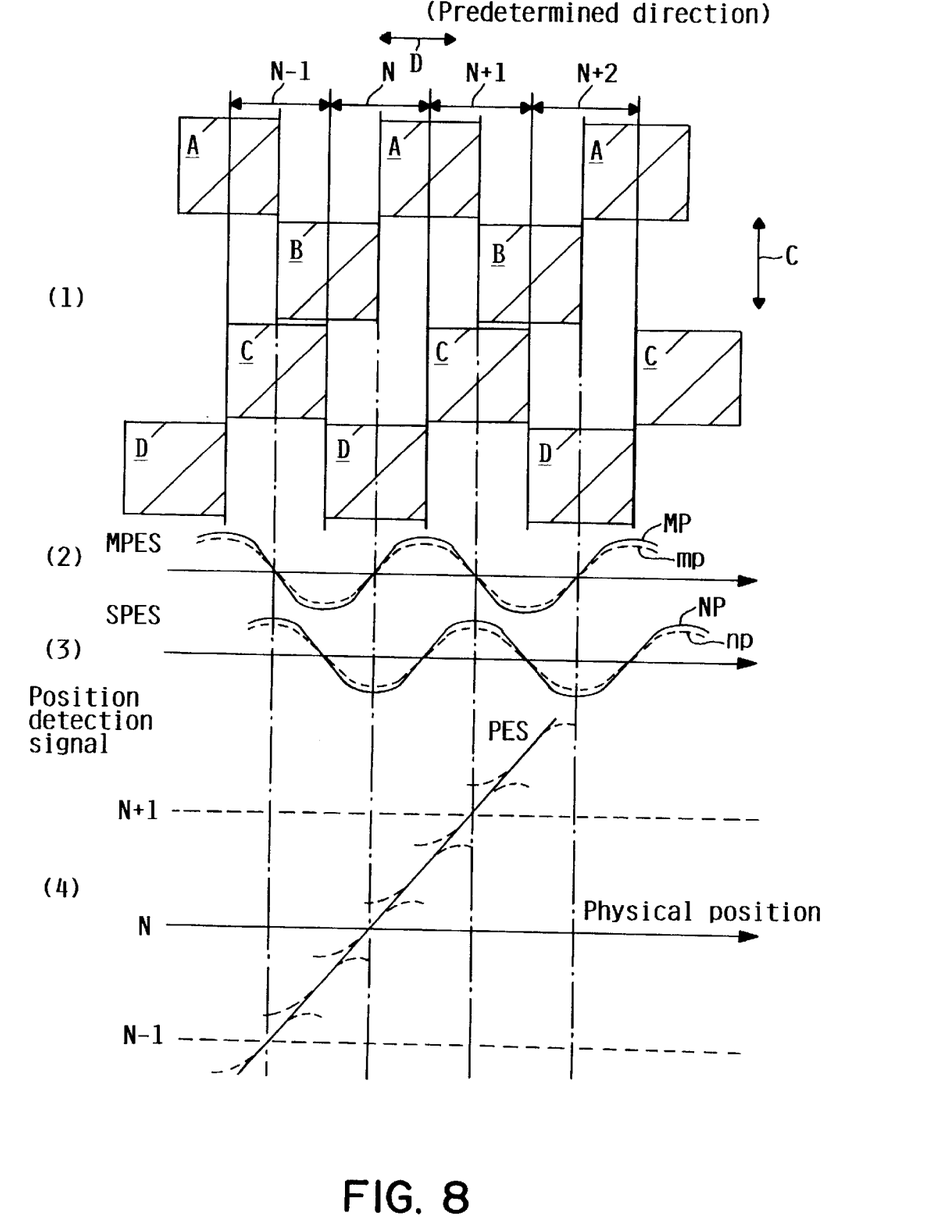
FIG. 8 is a diagram for describing the relationship between a position detection signal and a physical position.

In order to make the aforementioned magnetic head so that it corresponds to a specific data track, Published Unexamined Japanese Patent Application No. 6-243617 has proposed a magnetic disk unit, where burst patterns consisting four kinds of burst patterns are recorded on the magnetic disk and the magnetic head is positioned by a position detection signal obtained by calculating four kinds of signals obtained from the burst patterns. In FIG. 8 there is shown the periphery of the (N−1)st to (N+2)nd data tracks as an example of these burst patterns.

As shown in FIG. 8(1), in the aforementioned magnetic disk unit, the burst pattern is constituted by a main burst pattern consisting of areas A and B and a slave burst pattern consisting of areas C and D. In this figure, arrow C direction shows a rotational direction of the magnetic disk and arrow D direction shows a radial direction. The main burst pattern is recorded on the areas A and B shifted in the radial direction of the magnetic disk by the width of the track. That is, the areas A of the width, which is substantially identical with the data track width, are arranged along the radial direction (arrow D direction), and also the same areas B as the areas A are shifted from the areas A in the radial direction (arrow D direction) by the track width and are arranged. With this arrangement, the main burst pattern where areas are arranged in zigzag fashion is formed. Also, by shifting the areas C shifted from the areas B by the half track width and the same areas D as the areas C in the radial direction by the track width and then arranging the areas C and D the slave burst pattern where areas are arranged in zigzag fashion is formed.

Now, if the burst patterns are read while moving the magnetic head in the radial direction of the magnetic disk, then a position detection signal MP which varies as shown by a solid line in FIG. 8(2) will be obtained for the main burst pattern. A signal (hereinafter referred to as a signal SB), obtained by reading the burst pattern regarding the areas B, is subtracted from a signal (hereinafter referred to as a signal SA) obtained by reading the burst pattern regarding the areas A. The resultant signal (SA−SB) is divided by the signal SB added to the signal SA. The resultant signal (SA−SB)/(SA+SB) is the position detection signal MP. Note that, in FIG. 8(2), the axis of abscissa represents the position of the magnetic head (physical position), more particularly represents the longitudinal center position of a gap formed in the magnetic head.

Also, a position detection signal NP where the phase is shifted, as shown by a solid line in FIG. 8(3), is obtained for the slave burst pattern. A signal (hereinafter referred to as a signal SD), obtained by reading the burst pattern regarding the areas D, is subtracted from a signal (hereinafter referred to as a signal SC) obtained by reading the burst pattern regarding the areas C. The resultant signal (SC−SD) is divided by the signal SD added to the signal SC. The resultant signal (SC−SD)/(SC+SD) is the position detection signal NP.

As shown in FIG. 8(2), the position detection signal regarding the main burst pattern linearly varies when passing through the vicinity of the widthwise (arrow D direction of FIG. 8) central portion of the Nth data track. This is also the same when passing through the widthwise central portions of other data tracks. Therefore, based on the level of the position detection signal the position of the magnetic head can be judged, and based on the level of the position signal the magnetic head can be positioned so that the central portion of the magnetic head (more specifically, the central portion of the read portion of the magnetic head, that is, the longitudinal central portion of a so-called gap) is located over the widthwise central portion of the data track.

However, in the position detection signal shown in FIG. 8(2), when the magnetic head is located in the vicinity of the boundary between adjacent data tracks, there is an interval where the level is substantially constant. This occurs because the longitudinal dimension of the read portion (gap) of the magnetic head is smaller than the width dimension of the data track. The aforementioned interval is called a dead zone, because the position of the magnetic head cannot be specified.

In the vicinity of the boundary of a data track such as this, as shown in FIG. 8(3), the position detection signal regarding the slave burst pattern linearly varies. Therefore, in the vicinity of the boundary of the data track, the position of the magnetic head can be judged based on the position detection signal regarding the slave burst pattern.

Therefore, by switching the position detection signal about the main or slave burst pattern in correspondence with the position of the magnetic head on the data track, a position detection signal which linearly varies over a wide range with respect to the movement of the magnetic head can be obtained. Based on the level of the signal, the position of the magnetic head can be judged. Based on the level of the position signal, the magnetic head can be positioned.

Incidentally, a magnetic head that reads out information by using a magnetoresistive element (hereinafter referred to as an MR element) has been proposed in recent years. The MR element is an element making use of an MR effect where, if a semiconductor is placed in a magnetic field, the advancing direction of the electrons or positive holes in the semiconductor will be varied by the magnetic field, the traveling path will become longer and the resistance value will increase. In a magnetic head which reads information by using this MR element and writes information by using a coil, a read gap and a write gap are separately provided and the longitudinal dimension of the read gap is made short to improve an error rate. In addition, the longitudinal center position (center) of the read gap and the center of the write gap are shifted from each other for reasons of the physical arrangement.

Therefore, in a case where writing of information is performed, it is necessary to locate the magnetic head in the position where the center of the write gap is aligned with the widthwise central portion of the data track, i.e., the position where the center of the read gap is shifted from the widthwise center portion of the data track. However, because the longitudinal direction of the read gap is shortened, as previously described, and the aforementioned interval which is a dead zone becomes long, the linear area where the position detection signal linearly varies with respect to the movement of the magnetic head is insufficient. Therefore, because the range where the position of the magnetic head can be detected becomes very narrow, it has been required to detect the position of the magnetic head with higher accuracy.

However, in the aforementioned magnetic disk unit, there are some cases where a size obtained as a position detection signal varies at every magnetic head or depending the radial direction of the magnetic disk, because of the state of the magnetic head, for example, a variation in voltages supplied to the magnetic head and in surrounding temperatures, an electrical offset contained in the burst pattern, and an offset produced at the time of magnetic recording.

That is, there are some cases where a position detection signal mp shown by a broken line in FIG. 8(2) and a position detection signal np shown by a broken line in FIG. 8(3) are shifted from a reference position detection signal (solid line) because of the state of the magnetic head or an electrical or magnetic offset. Therefore, the size of the position detection signal (amplitude, for example) cannot be obtained stably for all data tracks.

In this case, an ideal position detection signal which linearly varies as shown by a solid line in FIG. 8(4) cannot be obtained, and a separated characteristic is obtained as shown by a solid line in FIG. 8(4). In FIG. 8(4), the axis of ordinate represents the position of the magnetic head obtained from the position detection signal and the axis of abscissa represents the physical position of the magnetic head.

In order to eliminate the problems of the state of the magnetic head and the electrical or magnetic offset, it is conceivable to correct the gain of a servo loop used for a track following operation. However, because a difference in the gain of a servo circuit itself or in the gain of an actuator for moving the magnetic head (for example, a voice coil motor for rotating the magnetic head) must be added as a parameter, the position detection signal itself cannot be corrected. For this reason, the position detection signal becomes unstable.

Also, in order to obtain the position detection signal that linearly varies over a wide range like the aforementioned conventional technique, the switching of the position detection signal has to be performed at an optimum position. However, because a position detection signal that linearly varies cannot be obtained due to the state of the magnetic head and the electrical or magnetic offset, the position of the magnetic head is detected with the position detection signals mp and np departing from the straight portion (portion indicated by a broken line in FIG. 8(4) and so cannot be detected with accuracy. Therefore, the operation of the magnetic head becomes unstable.

A need exists for a magnetic head position detecting method and a magnetic disk apparatus which are capable of detecting the position of a magnetic head over a wide range by simple process that solve the above-identified problem. The present invention provides a solution to this and other problems, and offers other advantages over the prior art.

SUMMARY OF THE INVENTION

A magnetic head position detecting method is provided in which a first and a second position detection signal representative of a particular position of a magnetic head with respect to a magnetic disk is obtained. The first and the second position detection signal preferably is obtained by utilizing a burst pattern formed on the magnetic disk. Subsequently, a third position detection signal is generated by multiplying the first and the second position detection signals by a predetermined gain so that the third position detection signal changes linearly. The particular position of the magnetic head is detected by using the third position detection signal.

The magnetic head position detecting method described above in an alternative embodiment comprises generating the third position detection signal by selecting the first position detection signal as the third position detection signal, when the particular position of the magnetic head is within a predetermined range, selecting the second position detection signal as the third position detection signal, when the particular position of the magnetic head is outside the predetermined range, and multiplying the third position detection signal by the predetermined gain so that the third position detection signal changes linearly.

In either magnetic head position detecting method as described above, the obtaining step may include moving the magnetic head to the particular position proximate the magnetic disk. Similarly, the burst pattern may consist of a plurality of burst pattern strings where each of the burst pattern strings extends in a radial direction of the magnetic disk. Also, the generating step may involve utilizing one of a plurality of gain values as the predetermined gain based on a zone of the magnetic disk from which each position detection signal is obtained where each of the plurality of gain values is calibrated by setting an optimum gain for a different zone of the magnetic disk.

In addition, a magnetic disk apparatus implementing the magnetic head position detecting method is provided. The magnetic disk apparatus preferably includes a magnetic disk having a plurality of zones and a burst pattern and a magnetic head which reproduces a signal representative of data stored on the magnetic disk. An actuator is provided to move the magnetic head to a particular position proximate the magnetic disk. Also, a memory is used to store a predetermined gain for each of the plurality of zones. In addition, a generator capable of generating a third position detection signal by multiplying a first and a second position detection signals by the predetermined gain of one of the plurality of zones which corresponds to the particular position of the magnetic head so that said third position detection signal changes linearly. The first and the second position detection signal preferably are obtained by utilizing the burst pattern. A detector is provided which detects the particular position of the magnetic head by using the third position detection signal.

The magnetic disk apparatus described above in an alternative embodiment includes a generator which generates a third position detection signal by: selecting a first position detection signal as a third position detection signal, when the particular position of the magnetic head is within a predetermined range, or selecting a second position detection signal as the third position detection signal, when the particular position of the magnetic head is outside the predetermined range, and subsequently multiplying the selected third position detection signal by the predetermined gain of one of the plurality of zones which corresponds to the particular position of the magnetic head so that the third position detection signal changes linearly. As noted above, the first and the second position detection signal preferably are obtained by utilizing the burst pattern.

In either magnetic disk apparatus described above, a plurality of magnetic heads may be used in conjunction with one another. In such instances the memory preferably also stores a predetermined gain for each of the plurality of magnetic heads.

These and various other features as well as advantages which characterize the present invention will be apparent upon reading of the following detailed description and review of the associated drawings.

DETAILED DESCRIPTION

Figure 1:
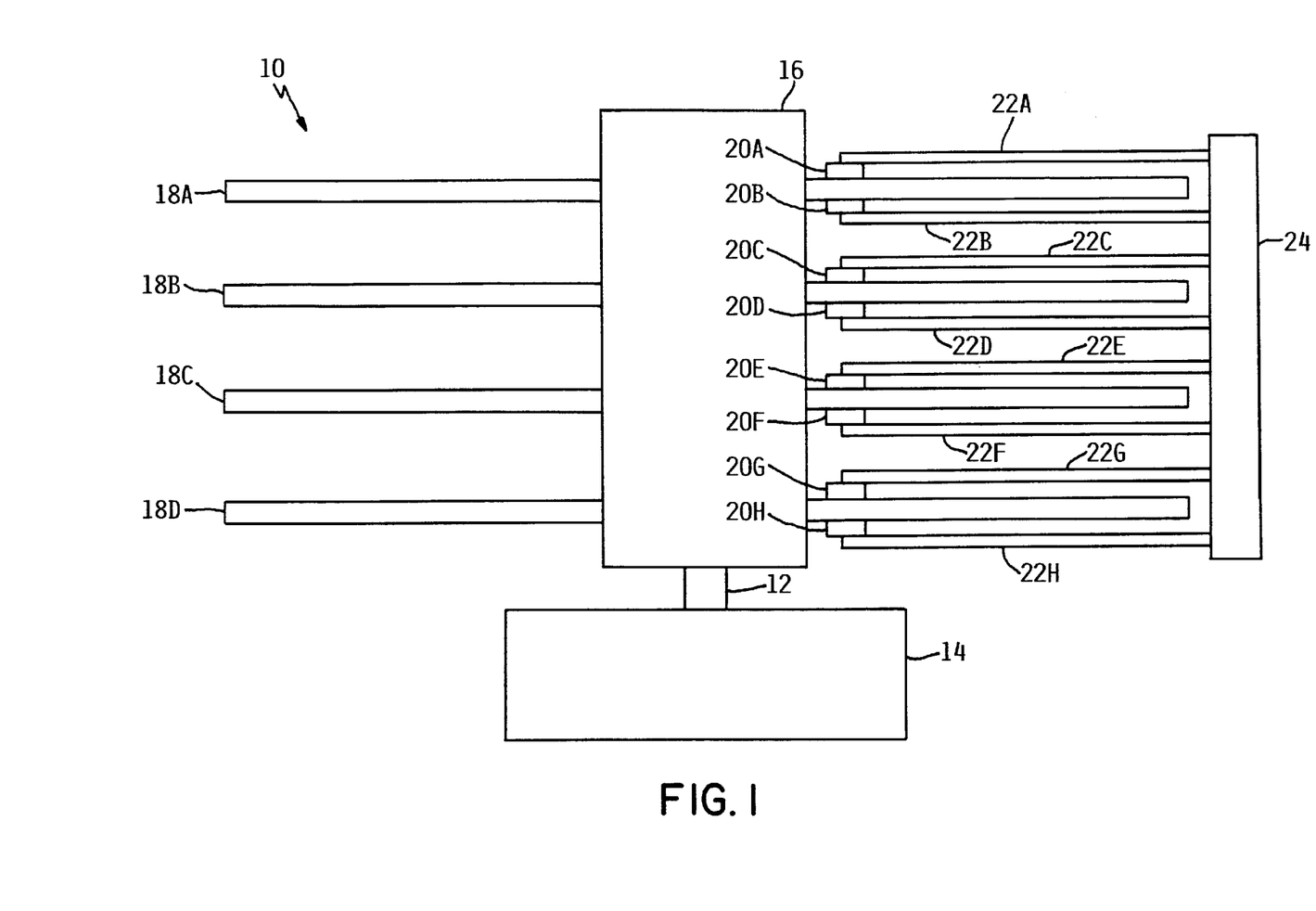
FIG. 1 is a block diagram of a hard disk unit according to an embodiment of the present invention.

An example of a preferred embodiment of the present invention will hereinafter be described in detail in reference to the drawings. In FIG. 1, there is shown a hard disk unit 10 as a magnetic disk unit according to the embodiment of the present invention. The hard disk unit 10 is equipped with a driver 14 which spins a shaft 12 at a high speed. A cylindrical support body 16 is attached on the shaft 12 so that their axes coincide with each other, and disks 18A, 18B, 18C, and 18D serving as a plurality of magnetic disk (in FIG. 1 four disks) are attached on the outer peripheral surface of the support body 16 at predetermined intervals.

The disks 18A to 18D each are formed into a circular shape of predetermined thickness dimension with hard material, and both sides are coated with a magnetic material and are used as recording surfaces. The central portions of the disks 18A to 18D are formed with holes of substantially the same diameter as the outer diameter dimension of the support body 16. The support body 16 is inserted into the holes, whereby the disks 18A to 18D are fixed to the outer peripheral surface of the support body 16. Therefore, if the shaft 12 is rotated by the driver 14, the disks 18A to 18D will be rotated integrally with the support body 16.

Figure 2:
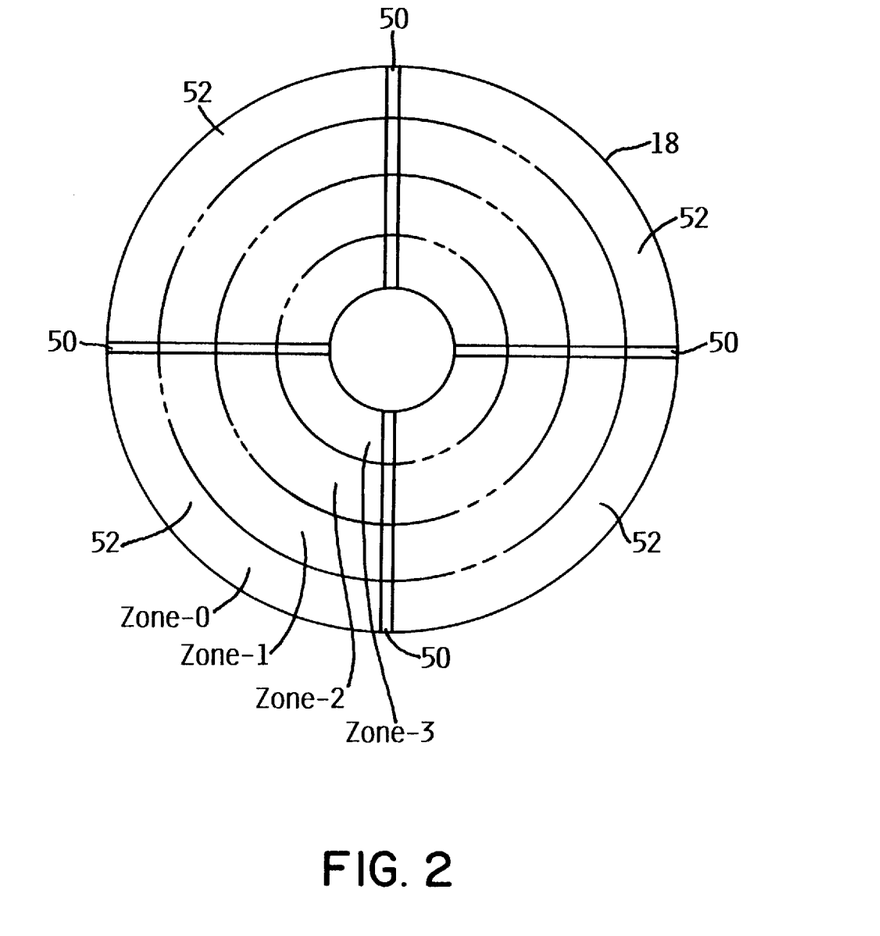
FIG. 2 is a plan view showing the burst-pattern recorded areas of a disk.
Figure 3:
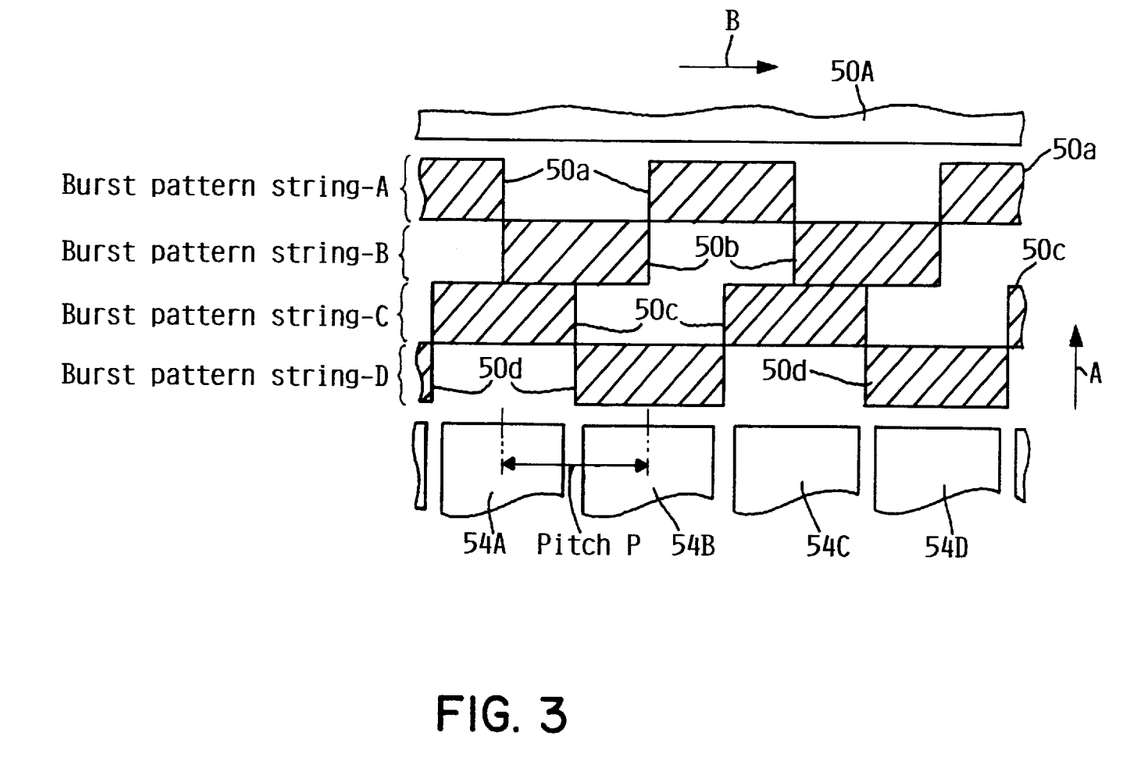
FIG. 3 is a plan view showing the data tracks and the burst patterns recorded on the burst-pattern recorded areas.

A plurality of burst pattern recording areas 50, as shown in FIG. 2, are radially formed on each recording surface of the disks 18A to 18D along the radial direction of the disk 18, and the remaining areas are used as data track areas 52. On the burst pattern recording area 50, a burst pattern is formed by recording signals by a predetermined pattern. FIG. 3 illustrates the burst pattern formed on the burst pattern recording area 50 and part of the data track area 52.

A plurality of data tracks are concentrically formed on the data track areas 52 at intervals of pitch P, and data tracks 54A, 54B, 54C, and 54D which are some of the plurality of data tracks are shown in FIG. 3. Information is written to each data track along the rotational direction (arrow A direction in FIG. 3) of the disk 18 by a magnetic head to be described later.

The burst pattern formed on the burst pattern recording area 50, as shown in FIG. 3, is comprised of four burst pattern strings (burst pattern strings A through D) where signal-recorded areas (hatched portions in FIG. 3) are arrayed along the radial direction of the disk 18 (arrow B direction). For each of the signal recorded areas constituting each burst pattern string, the dimension along the radial direction of the disk 18 and the spacing between adjacent areas are made equal to the pitch P between the data tracks 54.

The burst pattern strings A and B constitute the main burst pattern of the present invention. The signal recorded areas 50a of the burst pattern string A and the signal recorded areas 50b of the burst pattern string B are disposed in zigzag fashion along the radial direction of the disk 18. And two of sides along arrow A direction circumscribing each area (first side and second side of the present invention) correspond to the widthwise central portion of the data track 54. The burst pattern strings A and B are formed by recording a signal on each area.

Also, the burst pattern strings C and D correspond to the slave burst pattern of the present invention. The signal recorded areas 50c of the burst pattern string C and the signal recorded areas 50d of the burst pattern string D are disposed in zigzag fashion along the radial direction of the disk 18. And two of sides along arrow A direction circumscribing each area (first side and second side of the present invention) correspond to the boundary between adjacent data tracks. The burst pattern strings C and D are formed by recording a signal on each area. Note that, on an area 50A included in the burst pattern recording area 50, a special code representative of the start of a pattern (non-signal area of about 1 microsecond ($\mu$sec), etc.) and a gray code representative of an address of each data track (cyclic binary code) are recorded in correspondence with the data tracks.

Figure 4:
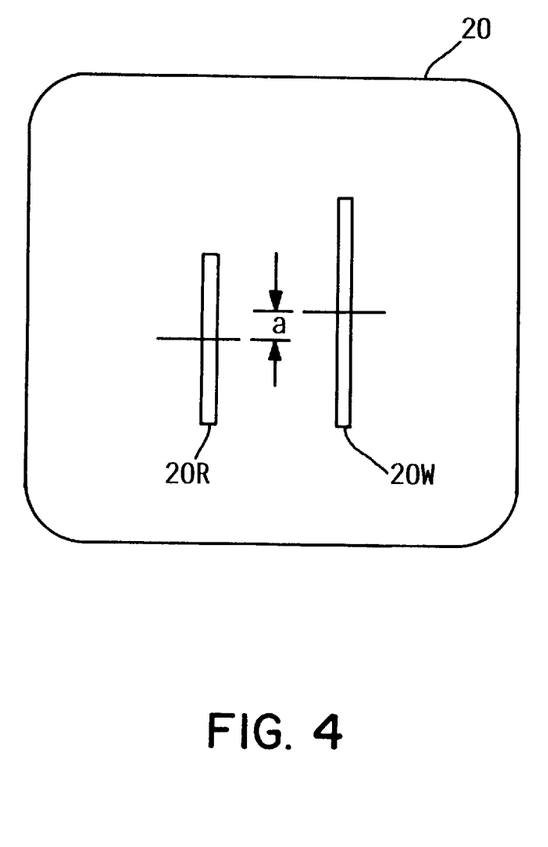
FIG. 4 is a plan view showing the read gap and write gap formed in the magnetic head.

Also, the hard disk unit 10 is equipped with magnetic heads 20A to 20H provided in correspondence with the recording surfaces of the disks 18A to 18D. On each of the magnetic heads 20A to 20H, as shown in FIG. 4, a read gap 20R for reading information and a write gap 20W for writing information, extending along the width direction of the data track, are formed. The read gap 20R is made shorter in longitudinal dimension than the write gap 20W and also the longitudinal center position (center) is shifted from the center of the write gap 20W (offset quantity is shown by "a" in FIG. 4).

Each magnetic head 20 is constructed, including a read element (not shown) for performing reading of information by making use of a MR element provided in correspondence with the read gap 20R and a write element (not shown) for performing writing of information by a coil provided in correspondence with the write gap 20W. The magnetic heads 20A to 20H are mounted on the front ends of access arms 22A to 22H, respectively, and each magnetic head is held in a position slightly (for example, about 0.1 to 0.2 $\mu$) away from a corresponding recording surface of the disks 18A to 18D. The other end of the access arm 22A to 22H on the opposite side of the end where the magnetic head 20 is mounted is attached to the driver 24.

The driver 24 is equipped with a voice coil motor 26 (see FIG. 5) for moving each access arm provided in correspondence with the access arms 22A to 22H. If the voice coil motor 26 is driven by a micro processing unit which will be described later, then it will move the access arms so that the magnetic heads 20A to 20H move along the radial direction of the disks 18A to 18D. With this arrangement, the magnetic heads 20A to 20H can be located over predetermined tracks on the recording surfaces of the disks 18A to 18D.

Figure 5:
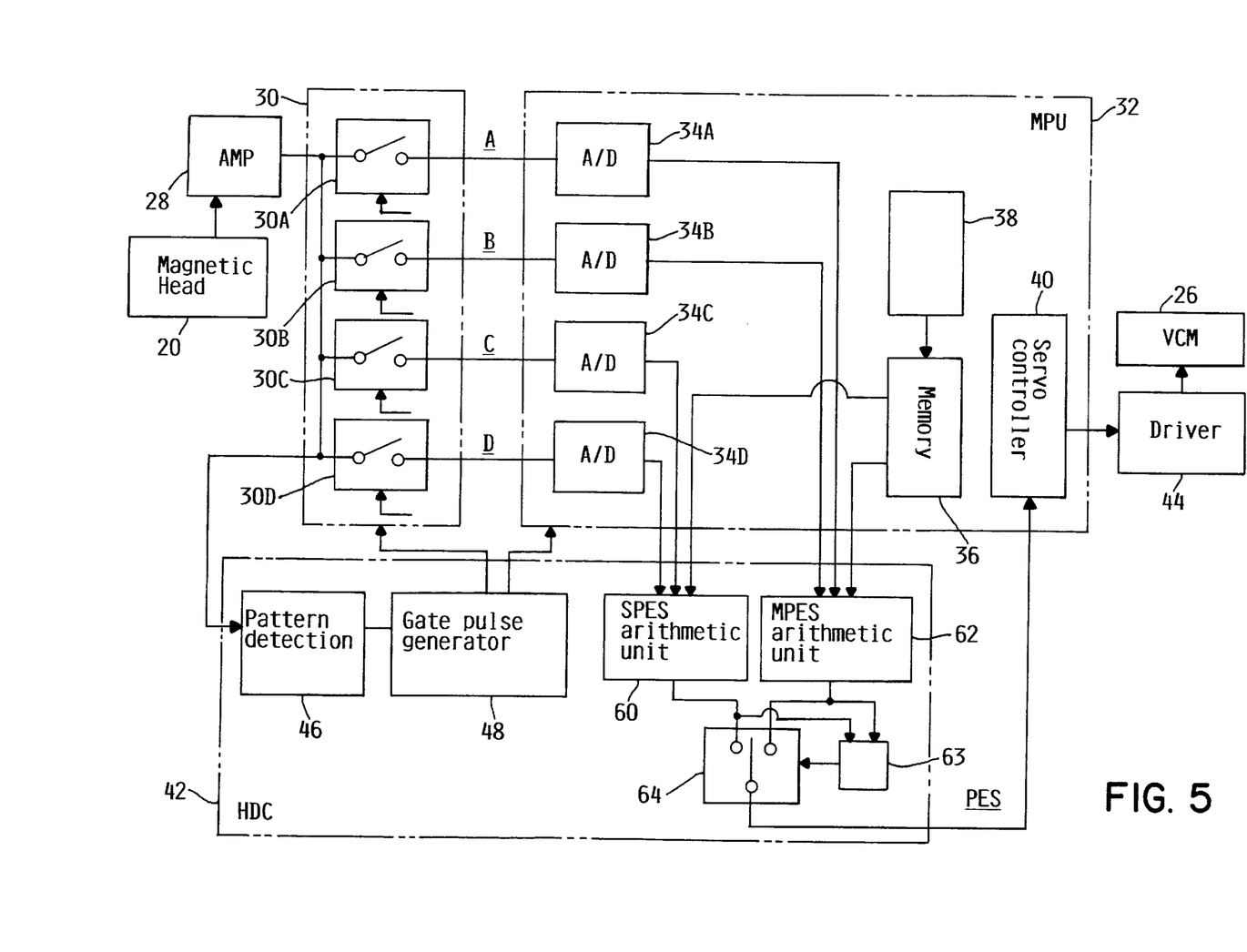
FIG. 5 is a block diagram showing the connection relationship between the micro processing unit (MPU) of a hard disk unit, the magnetic head, and the periphery.

The magnetic heads 20A to 20H each are connected to a circuit such as that shown in FIG. 5. The magnetic heads 20A to 20H are substantially identical in construction and therefore they will hereinafter be referred to as generically a magnetic head 20. A signal output terminal of the magnetic head 20 is connected to an input terminal of an amplifier 28 so that the signal output from the read element of the magnetic head 20 is amplified by the amplifier 28. An output terminal of the amplifier 28 is connected to an auto gain controller circuit 30. The auto gain controller circuit 30 is equipped with switching circuits 30A, 30B, 30C, and 30D, and the input terminals of the circuits are connected in parallel to the output terminal of the amplifier 28. Also, the output terminal of the amplifier 28 is connected to a hard disk controller 42 (hereinafter referred to as a HDC).

The HDC 42 is constructed, including an MPES arithmetic unit 62 for computing a main positioning signal as a position detection signal, an SPES arithmetic unit 60 for computing a slave positioning signal, a pattern detection circuit 46, and a gate pulse generator 48. In this HDC 42, the output terminal of the amplifier 28 is connected through the pattern detection circuit 46 to the gate pulse generator 48. This gate pulse generator 48 is connected to the switching circuits 30A to 30D of the auto gain controller circuit 30 and a micro processing unit 32 (hereinafter referred to as an MPU).

FIG. 5 schematically shows the switching circuits 30A to 30D as switches, but, in practice, the switching circuit is constructed, including switching elements such as transistors, and also serves as a noise removing filter. After a code representative of the start of a pattern has been detected by the pattern detection circuit 46, the gate pulse generator 48 turns on the switching circuit 30A only, when the magnetic head 20 corresponds to the burst pattern string A. The switching circuit 30A outputs a signal (hereinafter referred to as a signal A) corresponding to the burst pattern string A. Also, only the switching circuit 30B is turned on when the magnetic head 20 corresponds to the burst pattern string B and outputs a signal (hereinafter referred to as a signal B) corresponding to the burst pattern string B.

Likewise, only the switching circuit 30C is turned on when the magnetic head 20 corresponds to the burst pattern string C and outputs a signal (hereinafter referred to as a signal C) corresponding to the burst pattern string C. Also, only the switching circuit 30D is turned on when the magnetic head 20 corresponds to the burst pattern string D and outputs a signal (hereinafter referred to as a signal D) corresponding to the burst pattern string D.

The other end of the switching circuit 30A is connected to a signal input terminal of an analog-to-digital converter (hereinafter referred to as an A/D converter) 34A included in the MPU 32. The other end of the switching circuit 30B is connected to a signal input terminal of an A/D converter 34B. Likewise, the other end of the switching circuit 30C is connected to a signal input terminal of an A/D converter 34C, and the other end of the switching circuit 30D is connected to a signal input terminal of an A/D converter 34D. Therefore, the A/D converter 34A converts the signal A output by the switching circuit 30A into digital data and outputs the digital data. The A/D converter 34B converts the signal B output by the switching circuit 30B into digital data and outputs the digital data. Likewise, the A/D converter 34C converts the signal C output by the switching circuit 30C into digital data and outputs the digital data, and the A/D converter 34D converts the signal D output by the switching circuit 30D into digital data and outputs the digital data.

The output terminal of the A/D converter 34A of the MPU 32 is connected to the first input terminal of the MPES arithmetic unit 62, and the output terminal of the A/D converter 34B is connected to the second input terminal of the MPES arithmetic unit 62. Also, the output terminal of the A/D converter 34C of the MPU 32 is connected to the first input terminal of the SPES arithmetic unit 60, and the output terminal of the A/D converter 34D is connected to the second input terminal of the SPES arithmetic unit 60.

Also, the MPU 32 is equipped with a memory 36 in which a gain [H] to be described later is stored. The output terminals of the memory 36 are connected to the third input terminal of the MPES arithmetic unit 62 and the third input terminal of the SPES arithmetic unit 60. The memory 38 is further connected to a set memory 38 which temporarily stores the quantity (offset quantity) that the magnetic head 20 is shifted after it is moved to a predetermined data track (seek operation). The data corresponding to the data track of a predetermined position is input from the side of a host computer (not shown) to the set memory 38. That is, a value representative of a predetermined position for discriminating a zone and the quantity (offset quantity) that shifts the magnetic head after it is moved to the data track of a predetermined position, which is determined when the magnetic disk unit is manufactured, are input.

The output terminal of the MPES arithmetic 62 is connected to one input terminal of a selector 64, and the output terminal of the SPES arithmetic 60 is connected to the other input terminal of the selector 64. The MPES arithmetic unit 62, as will be describe later, computes and outputs a main positioning signal, based on the data that were input to the first input terminal, the second input terminal, and the third input terminal. Also, the SPES arithmetic unit 60, as will be describe later, computes and outputs a slave positioning signal, based on the data that were input to the first input terminal, the second input terminal, and the third input terminal.

The output terminals of the aforementioned MPES arithmetic unit 62 and SPES arithmetic unit 60 are also connected to an input terminal of a comparator 63. This comparator 63 compares the signals (main positioning signal and slave positioning signal) output by the MPES arithmetic unit 62 and the SPES arithmetic unit 60, respectively, and outputs the result of the comparison. That is, the comparator 63 is used for discriminating whether the position of the magnetic head 20 is within a predetermined value (±¼ track width, for example) from the central portion of the data track by comparing the sizes of the input signals. Based on the result of the comparison, the comparator 63 outputs a logic high level signal when the position of the magnetic head 20 corresponds to a value within a predetermined value. The output terminal of the comparator 63 is connected to a control terminal of the selector 64. Therefore, for example, if it is judged, based on the comparison result, that the position of the magnetic head 20 is within ±¼ track width, then the comparator 63 will output a logic high level signal to the selector 64. If the high level signal is input to the control terminal of the selector 64, then the selector 64 will be switched so that it outputs the data that was input from the MPES arithmetic unit 62. On the other hand, when the signal is not logic high, the selector 64 is switched so that it outputs the data that was input from the SPES arithmetic unit 60.

The output terminal of the selector is connected through a servo controller 40 and a driver 44 to a voice coil motor (hereinafter referred to as a VCM). Therefore, when the offset quantity is within a predetermined value (±¼ track width, for example), the data from the MPES arithmetic unit 62 is output by the selector 64, and in other cases, the data from the SPES arithmetic unit 60 is output by the selector 64. Based on the data from the selector 64, the servo controller 40 outputs a servo control signal to the driver 44. The driver 44 converts the signal into a drive signal, which is supplied to the VCM 26. With this, the VCM 26 is driven so that the magnetic head 20 follows a track at a predetermined position.

It is noted that, in the MPU 32, the position of the magnetic head 20 may be judged based on the data that were output from the A/D converters 34A to 34D.

The computation in the MPES arithmetic unit 62 and the SPES arithmetic unit 60 will hereinafter be described. In the following description it is assumed that the position of one data track is represented by a digital value ranging from 0 to 255 (0hex to FFhex). Therefore, the center position of the data track is expressed by 80hex. In the MPES arithmetic unit 62 in this embodiment of the present invention, a value obtained by the following equation 1 (Eq. 1) is output as a main positioning signal (position detection signal MPES). In the SPES arithmetic unit 60, a value obtained by the following equation 2 (Eq. 2) is output as a slave positioning signal (position detection signal SPES).

$$MPES = \frac{Ad - Bd}{Ad + Bd} \cdot [H] + 80hex \quad (Eq. 1)$$

$$SPES = \frac{Cd - Dd}{Cd + Dd} \cdot [H] + 80hex \quad (Eq. 2)$$

where:
Ad=digital value of the signal A,
Bd=digital value of the signal B,
Cd=digital value of the signal C,
Dd=digital value of the signal D, and
[H]=gain (arbitrary value).

When the gain [H] of each of the positioning signal obtained by the aforementioned Eqs. 1 and 2 is not an optimum value, the operation of the magnetic head 20 becomes unstable as described above.

The calibration for setting the gain of the positioning signal to this optimum gain is performed as follows:

Step 1: Set an arbitrary value ([H0]=40hex, for example) as an initial value [H0] of the gain [H], and also set the magnetic head 20, the disk, and the data track (cylinder) which are desired to be calibrated. In the magnetic head 20, the disk, and the data track (cylinder) which are desired to be calibrated, the magnetic head 20 is forced to follow the data track to a position shifted from the center of the data track (target position C0hex in the Nth data track of FIG. 8, for example) by +¼ track width from the center of the data track (80hex).

Step 2: In the state in step 1, a predetermined number of the values of the main positioning signals are extracted and the average value is obtained, according to the aforementioned Eq. 1. Let this average value be referred to as MPES_0.

Step 3: Obtain an optimum value [H] by using the following equation 3 (Eq. 3).

$$[H] = \frac{40hex}{MPES\_0 + 80hex} \cdot [H0] \quad (Eq. 3)$$

Thus, in the position shifted by ¼ track width, the position detection signal (PES signal) (i.e., representative of the position of the magnetic head) performs a track following operation, while making a transition between the main positioning signal and the slave positioning signal. The average value of the main positioning signal (MPES signal) in this state will represent a target position of that state of the magnetic head and therefore it is supposed that a value of the gain [H] for converting this average value to a value representative of a target position is an optimum value.

Step 4: The aforementioned steps 1 to 3 are performed for all combinations of the magnetic head 20, the disk, and the data track which are desired to be calibrated, and each gain [H] is obtained.

If the gain [H] is obtained in the aforementioned way, then an optimum gain will be set for all combinations of the magnetic head 20, the disk, and the data track, and the HDC can output an optimum position detection signal.

Figure 6:
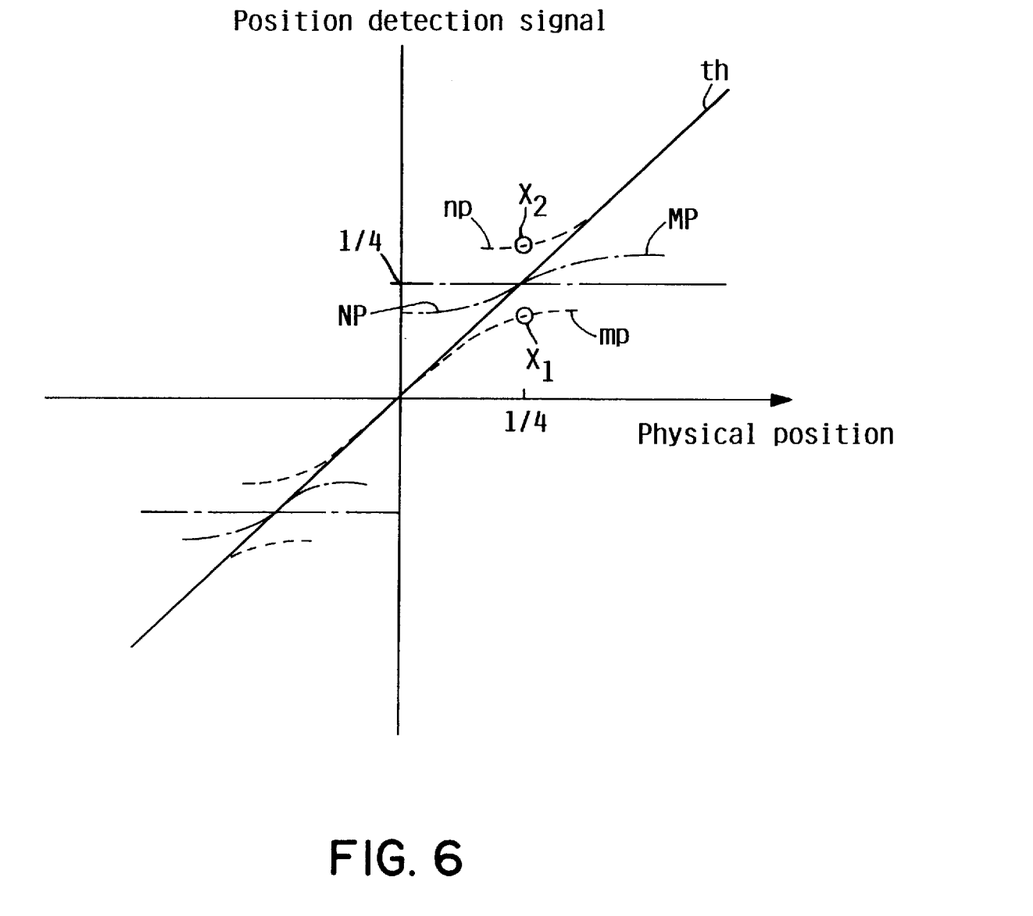
FIG. 6 is a detailed diagram for describing the relationship between a position detection signal and a physical position.

For example, consider a case where, in the Nth data track of FIG. 8, the position (C0hex) shifted from the center of the data track by +¼ track width is regarded as a target position and a track following operation is performed. The correspondence between the physical position and the position detection signal in that case, as shown in FIG. 6, will be expressed by the main positioning signal mp and the slave positioning signal np and will make a transition between the output corresponding to point $X_1$ and the output corresponding to point $X_2$ and become unstable, if an optimum gain [H] has not been set. That is, the gradients of the tangential lines of the main positioning signal mp and the slave positioning signal np depart from an ideal line th. Then, in the form of this embodiment, the gains of the main positioning signal mp and the slave positioning signal np are obtained in advance, and the signals are made close to the ideal line th by multiplying the obtained gains as in the aforementioned Eqs. 1 and 2. Therefore, the obtained signals become a main positioning signal MP and a slave positioning signal NP and a track following operation can be stably made in the vicinity of the position shifted as a target position by +¼ track width. In addition, switching can be smoothly made between the main positioning signal MP and the slave positioning signal NP.

It should be noted that, in the form of this embodiment, the aforementioned gains [H] have previously been obtained at the time of the fabrication of the magnetic disk unit (i.e., they have been predetermined) and the obtained gains [H] have previously been stored in the memory 36.

Also, the gains [H] have optimum values for all combinations of the magnetic head 20, the disk, and the data track, but, since a reduction in the track width of a data track has been advanced, it is predicted that a great variation would be reduced between adjacent data tracks. For this reason, it is preferable that a sheet of disk be segmented into a plurality zones in the radial direction (in an example of FIG. 2 four zones 0 to 3), as shown in FIG. 2, and that gains [H] be tabulated and stored for each zone, as shown in Table 1. Thus, by tabulating the gains [H], the storage capacity for storing gains can be made small and also the load of the process for obtaining optimum values can be reduced. Note that these gains [H] may be recorded on a disk and may be read out at a predetermined time, for example, when a power supply is turned on.

TABLE 1

| Zone   | 20A  | 20B  | 20C  | 20D  | 20E  | 20F  | 20G  | 20H  |
|--------|------|------|------|------|------|------|------|------|
| Zone-0 | HD01 | HD02 | HD03 | HD04 | HD05 | HD06 | HD07 | HD08 |
| Zone-1 | HD11 | HD12 | HD13 | HD14 | HD15 | HD16 | HD17 | HD18 |
| Zone-2 | HD21 | HD22 | HD23 | HD24 | HD25 | HD26 | HD27 | HD28 |
| Zone-3 | HD31 | HD32 | HD33 | HD34 | HD35 | HD36 | HD37 | HD38 | where:
- 20A to 20H: magnetic head,
- Zone-i: identifier representative of a zone,
- $HD_{ij}$: value of a gain [H],
- i: 0, 1, 2, 3, and
- j: 1, 2, . . . , 8.

Next, the operation of the hard disk unit in the form of this embodiment of the present invention will be described. If the host computer (not shown) requests a specific data track to make a track following operation by a predetermined offset quantity, then the contents will be set in the set memory. At this time, the seek operation has already been performed, the signals corresponding to the main burst pattern and the slave burst pattern are output by the magnetic head 20, and the signals A through D are output by the switching circuits 30A through 30D. The digital values corresponding to the amplitudes of these signals A through D are output by the A/D converters 34A through 34D and are read out by the MPES arithmetic unit 62 and the SPES arithmetic unit 60. At this time, in correspondence with the position (zone) of the data track and the offset quantity which have been set in the set memory 38, an optimum gain [H] is output by the memory 36. With this, the MPES arithmetic unit 62 and the SPES arithmetic unit 60 output positioning signals by using the aforementioned Eqs. 1 and 2. Because a control signal for selecting "which of the output signals of the MPES arithmetic unit 62 and the SPES arithmetic unit 60 is used as a position detection signal PES" is input from the set memory to the selector 64, either the output signal of MPES arithmetic unit 62 or the output signal of the SPES arithmetic unit 60 is output to the servo controller 40 in correspondence with the position of the magnetic head 20. Based on the output signal from this selector 64, the servo controller 40 outputs a servo control signal. The driver 44 converts the servo control signal into a drive signal, and the drive signal is supplied to the VCM 26. With this, the VCM 26 is driven so that the track following operation of the magnetic head 20 is performed at an optimum predetermined position.

Thus, in the embodiment of the present invention, the gain for correcting a position detection signal obtained from the output signal of the magnetic head has previously been obtained by referring to previously stored data and table. Therefore, even when the offset quantities differ depending upon positions on a disk, or, in a case where track following is performed by a magnetic head having an MR effect where a read element and a write element are provided at a predetermined interval, even when the magnetic head has a predetermined offset quantity and is servo-controlled, the position of the magnetic head can be detected with reliability from the regenerated output signal of the magnetic head and the magnetic head can be positioned with fidelity at an optimum position.

Also, even in a case where an individual difference occurred in each magnetic head, the individual difference can be corrected by setting an optimum gain and a linear position detection signal can be obtained over a wide range. In addition, even in a case where a difference occurred in each position on the disk due to mounting errors or the state of the disk, the difference in each position can be corrected by setting an optimum gain and a linear position detection signal can be obtained over a wide range.

While, in the foregoing description, the gains have been obtained and the obtained gains have been stored in a memory or table, the present invention is not limited to this and the gains may be obtained in sequence by computation. In addition, the gains may be computed and stored periodically. Thus, by periodically performing computation and storage, a variation in gains resulting from a mechanical or electrical change with the passage of time can be suppressed.

Figure 7:
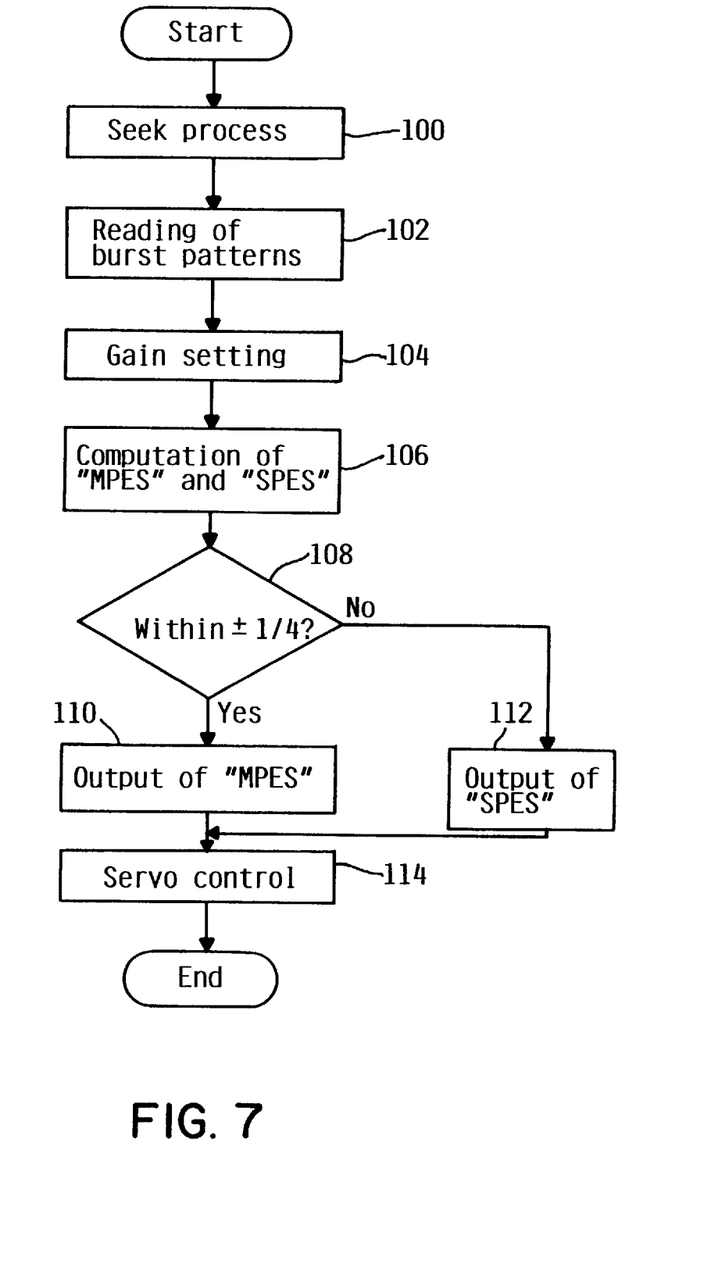
FIG. 7 is a flowchart showing the process flow of the hard disk unit for positioning the magnetic head.

While, in the aforementioned embodiment, the servo control of the magnetic head has been described with reference to hardware, it is also possible to process the servo control by software. An example of this case will be described in reference to a flowchart of FIG. 7. In step 100 of FIG. 7, the seek process of the magnetic head 20 to the disk is made. This seek process is a process of moving the magnetic head to the data track, which is determined according to setting, such as a data recording process, a data generating process, and a format process, by a command from a host command (not shown) such as a user's command. At this time, the object position of the magnetic head, the offset quantity of the magnetic head, etc., are set. Then, in step 102 the burst patterns are read out of the disk. That is, as previously described, the analog signals, which are the sizes of the amplitudes of the signals (A and B) corresponding to the main burst pattern, are digitized by the A/D converters 34A and 34B. Likewise, the analog signals, which are the sizes of the amplitudes of the signals (C and D) corresponding to the slave burst pattern, are digitized by the A/D converters 34C and 34D. In step 104, the gains [H] corresponding to the position of the data track and the offset quantity, determined in step 100, are set. The gains [H] may be obtained by reading out the data previously stored in a memory or table, as described above, or they may be obtained according to the aforementioned steps. In step 106, with the digital values Ad to Dd corresponding to the signals from the burst patterns and the gains [H], the main positioning signal and the slave positioning signal are obtained in reference to the aforementioned Equations (1) and (2). Next, in step 108 it is judged whether the offset quantity of an object position of the magnetic head is within ±¼ track width. When the offset quantity is within ±¼ track width, in step 110 the main positioning signal is output. When the offset quantity is not within ±¼ track width, in step 112 the slave positioning signal is output. Therefore, the signal, output in step 110 or step 112, becomes a position detection signal (PES signal). Next, in step 114, based on the position detection signal the access arm is driven so that the magnetic head 20 makes a track following operation.

In accordance with the present invention, as has been described above, the relationship, between the relative position and an output signal which is output from the magnetic head at the relative position in correspondence with the burst pattern, is obtained. The present invention also obtains a gain. When the obtained relationship is a characteristic which linearly varies, this gain is obtained so that the gradient is set to a predetermined gradient. Therefore, the gain is a value for correcting an output signal which is actually output by the magnetic head so that the output signal reaches the relationship which is ideal. Therefore, the present invention has the advantage that the position of the magnetic head can be detected over a wide range by using a value obtained by multiplying the output signal which is output from the magnetic head in correspondence with the burst pattern by the gain.

Also, when the relative position between the magnetic disk to be positioned and the magnetic head is within a predetermined range, the relative position is detected by using a value obtained by multiplying the output signal which is output from the magnetic head in correspondence with the main burst pattern by the gain. When the relative position is outside the predetermined range, the relative position is detected by using a value obtained by multiplying the output signal which is output from the magnetic head in correspondence with the slave burst pattern by the gain. Therefore, even when the position detection signal is switched and used, each output signal becomes an optimum signal and there is no occurrence of a variation in the output signal. Therefore, the present invention has the advantage that the position of the magnetic head can be stably detected over a wide range.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A magnetic head position detecting method, comprising steps of:
   (a) obtaining a first and a second position detection signals representative of a particular position of a magnetic head with respect to a magnetic disk, the first and the second position detection signals being obtained by utilizing a burst pattern formed on the magnetic disk;
   (b) generating a third and fourth position detection signals by multiplying the first and the second position detection signals by a predetermined gain so that the third and fourth position detection signals change linearly; and
   (c) detecting the particular position of the magnetic head by using the third and fourth position detection signals.

2. The magnetic head position detecting method of claim 1 wherein the obtaining step comprises moving the magnetic head to the particular position proximate the magnetic disk.

3. The magnetic head position detecting method of claim 1 wherein the burst pattern comprises a plurality of burst pattern strings, each of the burst pattern strings extending in a radial direction of the magnetic disk.

4. The magnetic head position detecting method of claim 1 wherein the generating step comprises utilizing one of a plurality of gain values as the predetermined gain based on a zone of the magnetic disk from which each position detection signal is obtained, each of the plurality of gain values being calibrated by setting an optimum gain for a different zone of the magnetic disk.

5. The magnetic head position detecting method of claim 1 wherein the generating step comprises steps of:

(b)(i) selecting the third position detection signal when the particular position of the magnetic head is within a predetermined range; and
(b)(ii) selecting the fourth position detection signal when the particular position of the magnetic head is outside the predetermined range.

6. A magnetic head position detecting method, comprising steps of:
   (a) moving a magnetic head to a particular position proximate a magnetic disk;
   (b) obtaining a first and a second position detection signals representative of the particular position of the magnetic head with respect to the magnetic disk, the first and the second position detection signals being obtained by utilizing a burst pattern formed on the magnetic disk;
   (c) generating a third and fourth position detection signals by: multiplying the first and second position detection signals by the predetermined gain to generate the third and fourth position detection signals so that the third and fourth position signals change linearly, selecting the third position detection signal when the particular position of the magnetic head is within a predetermined range, and selecting the fourth position detection signal when the particular position of the magnetic head is outside the predetermined range; and
   (d) detecting the particular position of the magnetic head by using the selected position detection signal.

7. The magnetic head position detecting method of claim 6 wherein the burst pattern comprises a plurality of burst pattern strings, each of the burst pattern strings extending in a radial direction of the magnetic disk.

8. The magnetic head position detecting method of claim 6 wherein the generating step comprises utilizing one of a plurality of gain values as the predetermined gain based on a zone of the magnetic disk from which each position detection signal is obtained, each of the plurality of gain values being calibrated by setting an optimum gain for a different zone of the magnetic disk.

9. A magnetic disk apparatus comprising:
   (a) a magnetic disk which comprises a plurality of zones and a burst pattern;
   (b) a magnetic head which reproduces a signal representative of data stored on the magnetic disk, the signals further comprising a first and second position detection signals obtained from the burst pattern;
   (c) an actuator which moves the magnetic head to a particular position proximate the magnetic disk;
   (d) a memory which stores a predetermined gain for each of the plurality of zones;
   (e) a generator which generates a third and fourth position detection signals by multiplying the first and the second position detection signals by the predetermined gain of one of the plurality of zones which corresponds to the particular position of the magnetic head so that said third and fourth position detection signals change linearly; and
   (f) a detector which detects the particular position of the magnetic head by using the third and fourth position detection signals.

10. The magnetic disk apparatus of claim 9 wherein the burst pattern of the magnetic disk comprises a plurality of burst pattern strings, each of the burst pattern strings extending in a radial direction of the magnetic disk.

11. The magnetic disk apparatus of claim 9 wherein each predetermined gain stored in the memory comprises a gain value calibrated by setting an optimum gain for a different zone of the plurality of zones of the magnetic disk.

12. The magnetic disk apparatus of claim 9 wherein the generator comprises a mechanism which generates the third and fourth position detection signal by: (i) selecting the third position detection signals when the particular position of the magnetic head is within a predetermined range, and (ii) selecting the fourth position detection signal when the particular position of the magnetic head is outside the predetermined range.

13. The magnetic disk apparatus of claim 9 further comprising a plurality of magnetic heads and wherein the memory further stores a predetermined gain for each of the plurality of magnetic heads.

14. A magnetic disk apparatus comprising:
   (a) a magnetic disk which comprises a plurality of zones and a burst pattern;
   (b) a magnetic head which reproduces a signal representative of data stored on the magnetic disk, the signal further comprising a first and second position detection signals obtained from the burst pattern;
   (c) an actuator which moves the magnetic head to a particular position proximate the magnetic disk;
   (d) a memory which stores a predetermined gain for each of the plurality of zones;
   (e) a generator which generates third and fourth position detection signals by: (i) multiplying the first and second position detection signals by the predetermined gain to generate the third and fourth position detection signals so that the third and fourth position detection signals change linearly, (ii) selecting the third position detection signal when the particular position of the magnetic head is within a predetermined range, and (iii) selecting the fourth position detection signal when the particular position of the magnetic head is outside the predetermined range; and
   (f) a detector which detects the particular position of the magnetic head by using the selected position detection signal.

15. The magnetic disk apparatus of claim 14 wherein the burst pattern of the magnetic disk comprises a plurality of burst pattern strings, each of the burst pattern strings extending in a radial direction of the magnetic disk.

16. The magnetic disk apparatus of claim 14 wherein each predetermined gain stored in the memory comprises a gain value calibrated by setting an optimum gain for a different zone of the plurality of zones of the magnetic disk.

17. The magnetic disk apparatus of claim 14 further comprising a plurality of magnetic heads and wherein the memory further stores a predetermined gain for each of the plurality of magnetic heads.

* * * * *